United States Patent [19]

Imai et al.

[11] Patent Number: 5,188,698

[45] Date of Patent: Feb. 23, 1993

[54] RESIN-SANDWICHED METAL LAMINATE, PROCESS AND APPARATUS FOR PRODUCING THE SAME AND PROCESS FOR THE PRODUCING RESIN FILM FOR THE RESIN-SANDWICHED METAL LAMINATE

[75] Inventors: Ryuusuke Imai; Michio Nashiwa; Yasuhiro Oomura; Ryouichi Matsuda; Michio Satou; Tamayuki Takeuchi, all of Toukai, Japan

[73] Assignee: Nippon Steel Corporation, Tokyo, Japan

[21] Appl. No.: 859,096

[22] Filed: Mar. 27, 1992

Related U.S. Application Data

[62] Division of Ser. No. 777,722, Oct. 16, 1991, which is a division of Ser. No. 461,125, Jan. 4, 1990, Pat. No. 5,084,357.

[30] Foreign Application Priority Data

Jan. 23, 1989 [JP] Japan ................................. 1-11980
Oct. 12, 1989 [JP] Japan ................................. 1-263884
Oct. 12, 1989 [JP] Japan ................................. 1-263885
Nov. 17, 1989 [JP] Japan ................................. 1-297642

[51] Int. Cl.$^5$ ............................................. B32B 31/06
[52] U.S. Cl. ................................. 156/500; 118/211;
118/216; 118/221; 118/222; 118/224; 118/255;
118/501; 427/256; 427/277; 427/278; 427/284;
427/286
[58] Field of Search ............... 156/202, 212, 213, 216,
156/243, 244.11, 244.27, 276, 291, 295, 500;
427/211, 277, 278, 284, 286, 256; 118/221, 222,
224, 211, 216, 248, 249, 255, 501, 602

[56] References Cited

U.S. PATENT DOCUMENTS

| | | | |
|---|---|---|---|
| 2,089,525 | 8/1937 | Abrams et al. ...................... | 427/286 |
| 2,646,612 | 7/1953 | Shearer ................................ | 118/222 |
| 3,106,480 | 10/1963 | Baker .................................. | 118/221 |
| 3,616,019 | 10/1971 | Mueller-Tamm et al. ......... | 156/244.27 |
| 3,684,610 | 8/1972 | Frielingsdorf et al. ............ | 156/244.27 |
| 3,972,764 | 8/1976 | Sendor ................................ | 427/286 |
| 4,064,288 | 12/1977 | Shah et al. ......................... | 118/211 |
| 4,272,312 | 6/1981 | Thompson ....................... | 156/244.11 |
| 4,279,673 | 7/1981 | White et al. ...................... | 428/284 |
| 4,313,996 | 2/1982 | Newman et al. .................. | 428/215 |
| 4,353,951 | 10/1982 | Yukitoshi et al. ................. | 428/198 |
| 4,521,265 | 6/1985 | Kunihiko et al. ................. | 156/243 |
| 4,554,033 | 11/1985 | Dery et al. ........................ | 156/295 |
| 4,588,456 | 5/1986 | Dery et al. ........................ | 156/295 |
| 4,666,547 | 5/1987 | Snowden et al. ................. | 156/276 |
| 4,729,809 | 3/1988 | Dery et al. ........................ | 156/276 |
| 4,732,818 | 3/1988 | Pratt et al. ........................ | 428/547 |
| 4,994,130 | 2/1991 | Kunihiko et al. ................. | 156/244.27 |

FOREIGN PATENT DOCUMENTS

0134958A2 3/1985 European Pat. Off.
50-27750 3/1975 Japan.
59-145142 8/1984 Japan.
62-53833 3/1987 Japan.
1360255 7/1974 United Kingdom.

Primary Examiner—Caleb Weston
Attorney, Agent, or Firm—Wenderoth, Lind & Ponack

[57] ABSTRACT

A resin-sandwiched metal laminate, a process and apparatus for producing the same and a process for producing a resin film for the resin-sandwiched metal laminate are disclosed. The laminate comprises a pair of face and back metal sheets and a resin layer and is capable of passing electricity between the face and back metal sheets, the resin layer being composed of electroconductive filler-containing resin regions at the side edges of the resin layer in the width direction of the metal sheets and an electroconductive filler-free resin center region provided between the electroconductive filler-containing resin regions at the side edges.

4 Claims, 9 Drawing Sheets

RESIN-SANDWICHED METAL LAMINATE, PROCESS AND APPARATUS FOR PRODUCING THE SAME AND PROCESS FOR THE PRODUCING RESIN FILM FOR THE RESIN-SANDWICHED METAL LAMINATE

This application is a division of pending application Ser. No. 07/777,722 filed Oct. 16, 1991, which is a division of Ser. No. 07/461,125 filed Jan. 4, 1990, now U.S. Pat. No. 5,084,357.

BACKGROUND OF THE INVENTION (1) Field of the Invention

This invention relates to a resin-sandwiched metal laminate for use in, for example, automobiles, domestic electric appliances and building materials, etc., a process and apparatus for producing the same and a process for producing a resin film for the resin-sandwiched metal laminate.

(2) Prior Art

Generally, a resin-sandwiched metal laminate is produced by applying a resin to one side of one metal sheet or band, placing another metal sheet or band on the resin-applied side and press-bonding the sheets or bands, or by placing a resin film between two metal sheets or bands, and likewise press-bonding the sheets or bands,[Japanese Patent Application Kokai (Laid-open) No. 62-53833, etc.].

It is also known to add an electroconductive filler such as fibers, powders and other irregularly shaped particles of metals, for example, iron, nickel, carbon steel, stainless steel, aluminum, titanium, etc., and non-metals, for example, carbon, etc. to the resin layer in the resin-sandwiched metal laminate, thereby endowing the resin-sandwiched metal laminate with an electroconductivity to obtain a weldability [Japanese Patent Application Kokai (Laid-open) No. 59-145142, etc.]. The electroconductive filler is provided throughout the resin layer between the two metal sheets and thus the resin-sandwiched metal laminate has a good weldability in any region on the face and back sides of the resin-sandwiched metal laminate.

In the production of a vessel-shaped member, etc., for example, as shown in FIG. 17, a drum body 40 is formed, and flanges 41 are made of the upper and lower ends 41 of the drum body 40 to weld the flanges 41 to another member 43. In that case, and electroconductive filler-containing resin can be provided in the regions at both side edges of a resin-sandwiched metal laminate and an electroconductive filler-free resin can be provided in the center region between the side edge regions. That is, it is not advantageous to provide the electroconductive filler-containing resin in the regions not destined for the welding, because the adhesiveness of the resin to the metal and the vibration damping of the resin are a little inferior to those of the electroconductive filler-free resin. Furthermore, the electroconductive filler is used wastefully in that case. And particularly in the case of an expensive filler such as nickel, etc., such disadvantages as considerably high production cost, etc. are inevitably entailed.

In the production of the resin-sandwiched metal laminate, a portion of the resin is squeezed out of both edges of the metal sheets or bands during the press-bonding, and remains attached to the surfaces of the metal sheets or bands to deteriorate the quality of the laminate, etc. That is, as shown in FIG. 15, when a resin 2 is provided between metal sheets or bands 10 and 10a and press-bonded by rolls 35 and 25a in the conventional process, a portion 2' of the resin 2 is squeezed out at the edges and is attached to the surfaces of the metal sheets or bands 10 and 10a, because both edges of the metal sheets or bands 10 and 10a take a straight form and thus the resin is squeezed out at the edges of the metal sheets or bands during the press-bonding.

It is also known to provide a resin between metal bands and press-bond the resin between the metal sheets throughout the full width in the width direction of the metal bands by pressing rolls [Japanese Patent Application Kokai (Laid-open) No. 50-27750].

However, in the production of such metal laminate, the pressing force is lighter in the regions at both side edges in the width direction of metal bands than in the center region, and this phenomenon is remarkable particularly in the case of using mill edge metal sheets. As shown in FIG. 16, when a resin 2 provided between metal bands 10 and 10a is press-bonded under a pressing force by press rolls 25 and 25a, which press the metal bands throughout the full width in the width direction of the metal bands, the resin 2 at the edge drop parts (whose one end is shown in the drawing) at both side edges in the width direction of the metal bands is not securely press-bonded between the metal bands 10 and 10a. Thus, such disadvantages as considerable deterioration of laminate quality, etc. are inevitably entailed.

SUMMARY OF THE INVENTION

The present invention was developed to successfully overcome the problems of the prior art.

An object of the present invention is to provide a resin-sandwiched metal laminate with distinguished adhesiveness between the metal sheets or bands and resin, weldability processability and other qualities, which has an electroconductive filler-containing resin and an electroconductive filler-free resin at required parts, respectively, between the metal sheets or bands, and a process for producing the same.

Hereinafter "metal sheet" will refer to both a metal sheet and a metal plate, and it will also refer to both of a metal sheet and a metal band, where a metal sheet having a large size in the longitudinal direction is called "metal band". The metal sheet has a state of a cut sheet and the metal band is wound to have a state of a coil.

In the case of vibration-damping metal sheets, another object of the present invention is to provide a resin-sandwiched metal laminate with an improved vibration damping property and a process for producing the same.

Another object of the present invention is to provide a resin-sandwiched metal laminate of low cost by saving the electroconductive filler, and a process for producing the same.

A further object of the present invention is to provide a process for producing a resin-sandwiched metal laminate with an improved adhesiveness of the resin to the metal sheets and an improved processability, capable of changing regions to be applied with an electroconductive filler-containing resin and an electroconductive filler-free resin in the width direction of metal sheets as desired, thereby providing weldable regions in accordance with members to be produced.

A still further object of the present invention is to provide a process for producing a resin-sandwiched metal laminate with an improved adhesiveness of the resin film to the metal sheets and an improved quality, capable of containing an electroconductive filler only in the required regions of the resin film.

A still further object of the present invention is to provide a resin-sandwiched metal laminate, capable of securely preventing the resin from squeezing out at the side edges of the metal sheet, thereby preventing deterioration of quality due to resin fouling, increasing the quality, saving the resin due to the squeezing-out and reducing the production cost by providing no resin in regions at predetermined distances from the side edges of metal sheets and/or by making the side edges in the width direction of at least one of the face and the back of metal sheets, between which the resin is present-bonded, into a special shape.

A still further object of the present invention is to provide a process for producing a resin-sandwiched metal laminate, capable of securely press-bonding a resin throughout the full width in the width direction of metal sheets, thereby remarkably improving the quality and the product yield by making the side edges in the width direction of metal sheets, between which the resin is press-bonded, into a special shape.

A still further object of the present invention is to provide an apparatus for producing a resin-sandwiched metal laminate, capable of attaining distinguished effect such as the effect that the excess resins can be reused in the application without intermixing.

The foregoing objects of the present invention can be attained by the following resin-sandwiched metal laminates and according to the following processes and apparatus.

(1) A resin-sandwiched metal laminate, which comprises a pair of face and back metal sheets and a resin layer and is capable of passing electricity between the face and back metal sheets, the resin layer being composed of electroconductive filler-containing resin regions at the side edges of the resin layer in the width direction of the metal sheets and an electroconductive filler-free resin center region provided between the electroconductive filler-containing resin regions at the side edges.

(2) A resin-sandwiched laminate according to (1), wherein the electroconductive filler-containing resin regions contain at least one metal powder selected from nickel powder, iron powder, stainless steel powder and aluminum powder as the electroconductive filler.

(3) A resin-sandwiched metal laminate according to (1), wherein the electroconductive filler-containing resin regions provided at the side edges are provided at a distance of 20 mm to 300 mm each from the side edges in the width direction of the metal sheets inwardly in the width direction.

(4) A resin-sandwiched metal laminate according to (1), wherein at least one of the side edges in the width direction of at least one of a pain of the face and back metal sheets is in a convex-curved shape toward the side edge in the width direction.

(5) A resin-sandwiched metal laminate according to (1), wherein the pair of the face and back sheets are steel sheets.

(6) A resin-sandwiched metal laminate according to (5), wherein the steel sheets are steel bands.

(7) A resin-sandwiched metal laminate according to any one of (1) to (6), wherein at least one portion of the electroconductive filler-free resin center region of the resin layer in the width direction of the metal sheets is composed of the electroconductive filler-containing resin instead of the electroconductive filler-free resin.

(8) A resin-sandwiched metal laminate according to (7), wherein the width of the one portion composed of the electroconductive filler-containing resin is 20–600 mm in the width direction of the metal sheets.

(9) A resin-sandwiched metal laminate according to any one of (1), (2) and (4) to (8), but wherein the resin layer is composed of electroconductive filler-free resin regions at the side edges of the resin layer in the width direction of the metal sheets and an electroconductive filler-containing resin center region between the electroconductive filler-free resin regions at the side edges.

(10) A process for producing a resin-sandwiched metal laminate, which comprises applying a resin to one side of one metal sheet, providing another metal sheet on the surface of the applied resin, and press-bonding the resin between the metal sheets,
wherein a resin supply passage on a resin table is divided into a center region and side edge regions in the width direction of the resin table, and an electroconductive filler-containing resin and an electronconductive filler-free resin are selectively supplied to the center region and the side edge regions and then applied to one side of one metal sheet.

(11) A process according to (10), wherein the electroconductive filler-containing resin and the electroconductive filler-free resin supplied to the center region and the side edge regions on the resin table are applied to one side of one metal sheet through an intermediate roll and a coater roll from the resin table.

(12) A process according to (10) or (11), wherein the electroconductive filler-free resin is supplied to the center region on the resin table and the electroconductive filler-containing resin is supplied to the side edge regions on the resin table.

(13) A process according to (10) or (11), wherein the electroconductive filler-containing resin is supplied to the center region on the resin table and the electroconductive filler-free resin is supplied to the side edge regions on the resin table.

(14) A process according to any one of (10) to (12), wherein the electroconductive filler-containing resin is applied to side edge regions on the one side of the one metal sheet, each of which has a distance of 20 to 300 mm from the side edge inwardly in the width direction of the metal sheet, and the electroconductive filler-free resin is applied to the remaining part on the one side of the metal sheet.

(15) A process according to any one of (10) to (12) and (14), wherein the electroconductive filler-containing resin is applied to the one side of the one metal sheet excluding the side edge regions, each of which has a distance of at least 10 mm and at most 15 mm from the side edge inwardly in the width direction of the metal sheet, when the resin has a thickness of 30 to 60 $\mu$m after the press-bonding.

(16) A process according to (13) or (14), wherein the electroconductive filler-free resin is applied to the one side of the one metal sheet excluding the side edge regions, each of which has a distance of at least 10 mm and at most 15 mm from the edge inwardly in the width direction of the metal sheet, when the resin has a thickness of 30 to 60 $\mu$m after the press-bonding.

(17) A process according to any one of (10) to (16), wherein at least one of the metal sheets has a convex-curved shape towards the side edge in the width direction at least at one side edge in the width direction.

(18) A process according to any one of (10) to (17), wherein after the resin is provided between the metal sheets, the metal sheets are pressed in the full width in the width direction of the metal sheets by pressing rolls, thereby press-bonding the resin between the metal sheets, and then the side edge parts in the width direction of the metal sheets are pressed by rolls, thereby press-bonding the resin.

(19) A process according to any one of (10) to (18), wherein the metal sheets are steel sheets.

(20) A process according to (19), wherein the steel sheets are steel bands.

(21) A process according to any one of (10) to (20), wherein a surface of the resin which has been applied to one side of one metal sheet is provided on a surface of the resin which has been applied to one side of another metal sheet and the resins are press-bonded between the metal sheets.

(22) A process for producing a resin-sandwiched metal laminate, which comprises providing a film resin between metal sheets and press-bonding the film resin between the metal sheets,
wherein a resin supply passage of resin discharge nozzle is divided into a center region and side edge regions in the width direction of the resin discharge nozzle, an electroconductive filler-containing resin and an electroconductive filler-free resin are selectively supplied to the center region and the side edge regions and discharged from the nozzle, thereby forming a film resin composed of the resins and the film resin is provided between the metal sheets.

(23) A process according to (22), wherein the film resin discharged from the nozzle, to which the resins are selectively supplied, is cooled and adjusted to a desired film thickness by a cooling roll, wound in a coil form together with a separating paper, thereby making a resin film, and the resin film is supplied to a resin-sandwiched metal laminate production facility and provided between the metal sheets.

(24) A process according to (22) or (23), wherein the electroconductive filler-free resin is supplied to the center region of the resin discharge nozzle and the electroconductive filler-containing resin is supplied to the side edge regions of the resin discharge nozzle.

(25) A process according to (22) or (23), wherein the electroconductive filler-containing resin is supplied to the center region of the resin discharge nozzle and the electroconductive filler-free resin is discharged to the side edge regions of the resin discharge nozzle.

(26) A process according to any one of (22) to (24), wherein the resin film is provided between the metal sheets in such a manner that the electroconductive filler-containing resin is provided in side edge regions, each of which has a distance 20 to 300 mm from the side edge inwardly in the width direction of the metal sheets and which are formed between the metal sheets, and the electroconductive filler-free resin is provided in the center region, which is the remaining part in the width direction of the metal sheets and which is formed between the metal sheets.

(27) A process according to any one of (22) to (26), wherein the electroconductive filler-containing resin is provided between the metal sheets in such a manner of excluding side edge regions, each of which has a distance of at least 10 mm and at most 15 mm from the side edge inwardly in the width direction of the metal sheets, when the resin film has a thickness of 30 to 60 μm after the press-bonding.

(28) A process according to (22) or (26), wherein the electroconductive filler-free resin is provided between the metal sheets in such a manner of excluding side edge regions, each of which has a distance of at least 10 mm and at most 15 mm from the side edge inwardly in the width direction of the metal sheets, when the resin film has a thickness of 30 to 60 μm after the press-bonding.

(29) A process according to any one of (22) to (28), wherein at least one of the metal sheets has a convex-curved shape towards the side edge in the width direction at least at one side edge in the width direction.

(30) A process according to any one of (22) to (29), wherein after the resin film is provided between the metal sheets, the metal sheets are pressed in the full width in the width direction of the metal sheets by pressing rolls, thereby press-bonding the resin between the metal sheets, and then the side edge parts in the width direction of the metal sheets are pressed by rolls, thereby press-bondling the resin.

(31) A process according to any one of (22) to (30), wherein the metal sheets are steel sheets.

(32) A process according to (31), wherein the steel sheets are steel bands.

(33) A process according to any one of (22) to (32), wherein a surface of the film resin which has been provided on one side of one metal sheet is provided on a surface of the film resin which has been provided on one side of another metal sheet and the film resins are press-bonded between the metal sheets.

(34) A process for producing a resin film for a resin-sandwiched metal laminate, which comprises dividing a resin discharge passage of resin discharge nozzle into a center region and side edge regions and selectively supplying an electroconductive filler-containing resin and an electroconductive filler-free resin to the center region and the side edge regions, thereby making a film resin composed of the resins.

(35) A process according to (34), wherein the film resin discharged from the nozzle, to which the resins are selectively supplied, is cooled and adjusted to a desired film thickness by a cooling roll and wound in a coil form together with a separating papaer, thereby making a resin film.

(36) A process according to (34), wherein the resin-sandwiched metal laminate is a resin-sandwiched steel sheet laminate.

(37) A process according to (35), wherein the steel sheet laminate is a steel band laminate.

(38) A process for producing a resin-sandwiched metal laminate which comprises the steps of: applying a resin to one side of one metal sheet, placing another metal sheet on the surface of the applied resin and press-bonding the resin between the metal sheets, or the steps of: providing a film resin between the metal sheets and press-bonding the film resin between the metal sheets, where the resin is provided in a center region in such a manner of excluding side edge regions, each of which is formed in the width direction of the metal sheets and between the metal sheets, and the resin is press-bonded between the metal sheets.

(39) A process according to (38), wherein the resin is provided in the center region in such a manner of excluding the side edge regions each of which has a distance of at least 10 mm and at most 15 mm from the side edge inwardly in the width direction of the metal sheets, when the resin has a thickness of 30 to 60 μm after the press-bonding.

(40) A process according to claim (38), wherein the metal sheets are steel sheets.

(41) A process according to (40), wherein the steel sheets are steel bands.

(42) A process for producing a resin-sandwiched metal laminate which comprises the steps of: applying a resin to one side of one metal sheet, placing another metal sheet on the surface of the applied resin and press-bonding the resin between the metal sheets, or the steps of: providing a film resin between the metal sheets and press-bonding the resin between the metal sheets, where each of the metal sheets has a convex-curved shape towards the side edges at both side edges in the width direction of the metal sheet, and the resin is provided between the metal sheets and press-bonded between the metal sheets.

(43) A process according to (42), wherein one of the metal sheets has a convex-curved shape toward side edges at both side edges in the width direction of the metal sheet and the other metal sheet has a straight shape at both side edges in the width direction of the metal sheet.

(44) A process according to (42) or (43), wherein the metal sheets are steel sheets.

(45) A process according to (44), wherein the steel sheets are steel bands.

(46) A process for producing a resin-sandwiched metal laminate, which comprises providing a resin between metal sheets, pressing the metal sheets in the full width in the width direction of the metal sheets by pressing rolls, thereby press-bonding the resin between the metal sheets, and then pressing both side edge parts in the width direction of the metal sheets by rolls, thereby press-bonding the resin.

(47) A process according to (46), wherein the metal sheets are steel sheets.

(48) A process according to (47), wherein the steel sheets are steel bands.

(49) A process for producing a resin-sandwiched metal laminate, which comprises providing a resin between metal sheets, pressing both side edges in the width direction of the metal sheets by rolls, thereby press-bonding the resin between the metal sheets, and then pressing the metal sheets in the full width in the width direction by pressing rolls, thereby press-bonding the resin between the metal sheets.

(50) A process according to (49), wherein the metal sheets are steel sheets.

(51) A process according to (50), wherein the steel sheets are steel bands.

(52) An apparatus for producing a resin-sandwiched metal laminate by applying a resin to one side of one metal sheet, placing another metal sheet on the surface of the applied resin and press-bonding the resin between the metal sheets, the apparatus having a resin-applying means which comprises:

resin supply passages formed by dividing a resin supply passage into a center region and side edge regions on a resin table in the width direction of the resin table, a resin tank for supplying an electroconductive filler-containing resin to one of the resin supply passages through an electroconductive filler-containing resin line, another resin tank for supplying an electroconductive filler-free resin to the remaining resin supply passage through an electroconductive filler-free resin line, a resin table for selectively supplying the electroconductive filler-containing resin and the electroconductive filler-free resin to a resin coater roll through a pickup roll, a resin coater roll for coating the selectively supplied resins to one side of one metal sheet, a resin receiver for recovering excess resin supplied to the resin supply passage formed in the center region on the resin table, resin receivers for recovering excess resin supplied to the resin supply passages formed in side edge regions on the resin table, and separators for recovering the electroconductive filler-containing resin and the electroconductive resin-free resin supplied in excess to the pickup roll and the coater roll without intermixing of the resins, provided at boundary positions of the resins.

(53) An apparatus according to (52), wherein the resin supply passages formed in the side edge regions on the resin table are measures having a resin supply outlet to the pickup roll surface.

(54) An apparatus according to (52), wherein the resin receivers for recovering the excess resin supplied to the resin supply passage formed in the side edge regions on the resin table are troughs and the separators are partition plates provided at the upper parts on both sides of the troughs.

(55) An apparatus according to (52), wherein resin return lines for returning the excess resin from the resin receivers to the respective resin tanks are further provided.

(56) An apparatus according to (52), wherein the metal sheets are steel sheets.

(57) An apparatus according to (56), wherein the steel sheets are steel bands.

BRIEF DESCRIPTION OF THE DRAWINGS

FIG. 1(a) is a plan view and FIG. 1(b) is a front view in the width direction.

DETAILED DESCRIPTION OF THE INVENTION

In the present invention, the resin supply passage on a resin table is divided in the width direction of the resin table in a center region and side edge regions at both side edges and the resin is selectively supplied to these regions and applied to one side of a metal sheet from the resin table by rolls. Then, another metal sheet is placed on the resin-applied surface and the metal sheets are press-bonded to make a resin-sandwiched metal laminate.

Figure 1A:
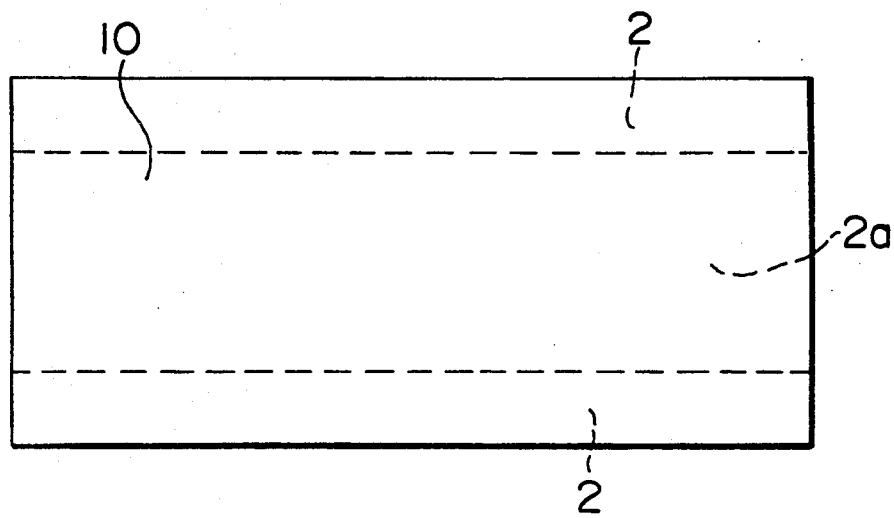
FIGS. 1(a) and 1(b) show a schematic view showing one embodiment of a resin-sandwiched metal laminate according to the present invention, where
Figure 1B:
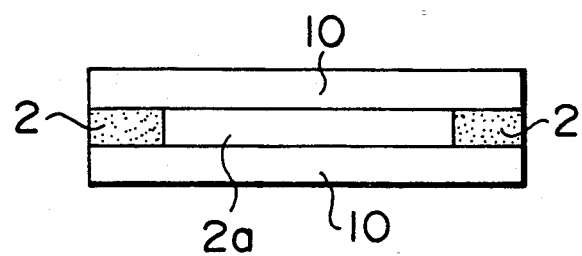

In the case of a vessel-shaped member requiring a weldability only at the upper and lower ends, an electroconductive filler-containing resin is supplied to the side edge regions at the side edges of the resin table and an electroconductive filler-free resin is supplied to the center region, and these resins are applied to one side of a metal sheet by rolls and another metal sheet is placed on the resin-applied surface. Then, the metal sheet are press-bonded to make a resin-sandwiched metal laminate provided with the electroconductive filler-conductive filler-containing resin 2 at the side edge regions in the width direction of metal sheet (steel sheet) 10 and the electroconductive filler-free resin 2a in the center region in the width direction of metal sheet 10, as shown in FIGS. 1(a) and 1(b).

In the case of giving a weldability only to the center region in the width direction of metal sheet to connect one member to another, etc., the electroconductive filler-containing resin is supplied to the center region and the electroconductive filler-free resin to the side edge regions to separately apply the resins to one side of a metal sheet, and then another metal sheet is placed on the resin-applied surface. The metal sheets are press-bonded to make a resin-sandwiched metal laminate.

In the case of giving a weldabilty to the entire surface, the electroconductive filler-containing resin is supplied to both of the center region and the side edge regions.

The metal sheet for use in the present invention includes, for example, steel sheets, aluminum sheets copper sheets, titanium sheets, tin sheets, stainless steel sheets, coated steel sheet, various plated sheets, surface treated steel sheets, etc. which are 0.2 to 1.0 mm thick and 600 to 1830 mm wide. The length is not limited in the case of metal bands. In the case of metal sheets, the length is 700 to 3200 mm.

The resin for use in the present invention includes, for example, usually available synthetic resins such as polyester, polyethylene, polyisobutylene, polyolefin system, etc., viscoelastic resins, solvent-type resins, film resins, etc., and the resin layer is 30 to 60 μm thick before the press-bonding and will be 30 to 60 μm after the press-bonding.

The electroconductive filler for use in the present invention includes, for example, electroconductive powders of iron, nickel, aluminum, stainless, etc., and any materials can be used so long as they provide electroconductivity between the face and back metal sheets. The particle size is 40 to 90 μm in diameter. For example, powders having a larger particle size than the thickness of the resin layer can be used, where the particle size can be made equal to the thickness of the resin layer by press-bonding the metal sheets to bring the powder into contact with the face and back metal sheets and make sure of the electroconductivity.

In the present invention, the electroconductive filler-containing resin is applied to the side edge regions of the resin-sandwiched metal laminate, and the content of the electroconductive filler in the resin is 15 to 30% by weight which can make the laminate electroconductive. The width of the electroconductive filler-containing resin region depends on the use, and a width of at least 5 to 90 mm in the width direction from the edge of the metal sheet inwardly before the press-bonding can give a good weldability. The greater the width of the electroconductive filler-free resin region, the better the adhesiveness of the resin to metal sheets and higher the vibration damping. The smaller the width of the electroconductive filler-containing resin region, the lower the production cost.

In the present invention, the press-bonding means the ordinary press-bonding and includes press-bonding with heating.

An example of producing the present resin-sandwiched metal laminate will be given below.

Figure 2:
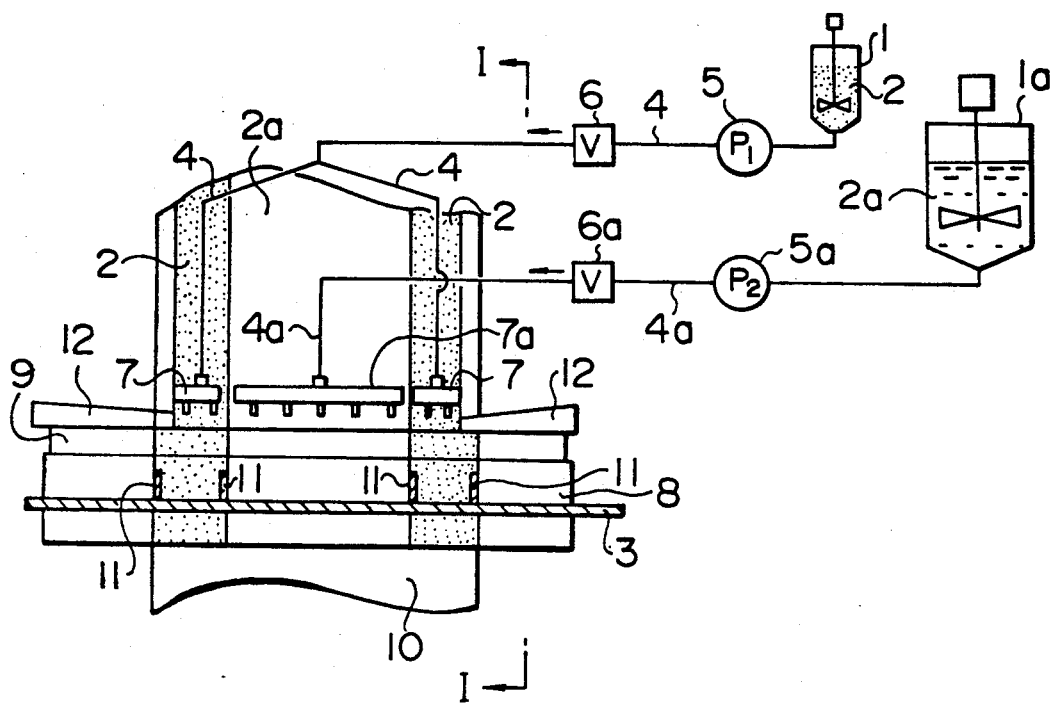
FIG. 2 is a schematic view showing one embodiment of an apparatus for producing a resin-sandwiched metal laminate according to the present invention and FIG. 3 is a schematic cross-sectional side view of the essential part of FIG. 2 as seen from the arrow I—I of FIG. 2.
Figure 3:
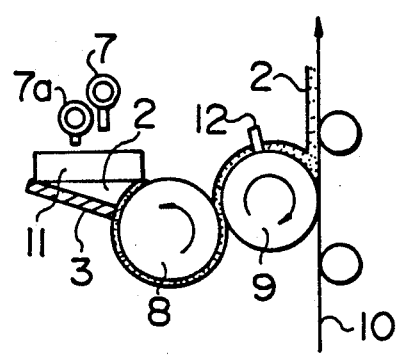

In FIGS. 2 and 3, an electroconductive filler-containing resin 2 is filled in a tank 1 and an electroconductive filler-free resin 2a is filled in another tank 1a. The electroconductive filler-containing resin 2 is supplied to the side edge regions of a resin table 3 from resin supply passages 4 provided at both side edges in the width direction of the resin table 3 through a pump 5, a valve 6 and nozzles 7. On the other hand, the electroconductive filler-free resin 2a is supplied to the center region of the resin table 3 from a resin supply passage 4a provided in the center region of the width direction of the resin table through a pump 5a, a valve 6a and a nozzle 7a. The resins supplied to the resin table 3 are applied to a metal sheet 10 through an intermediate roll 8 and a coating roll 9. That is, the electroconductive filler-containing resin 2 is applied to the side edge regions of the metal sheet 10 and the electroconductive filler-free resin 2a to the center region of metal sheet 10.

The amount of the resins to be applied is adjusted by adjusting a distance between the intermediate roll 8 and the coating roll 9. In FIGS. 2 and 3, numeral 11 is separators for separating the regions 2 and 2a from each other, and 12 is edge knives for making both edges of metal sheet 10 free from coating of the resin.

When the electroconductive filler-containing resin is applied to the center region of metal sheet 10 and the electroconductive filler-free resin to the side edge regions, the electroconductive filler-free resin is filled in the tank 1 and the electroconductive filler-containing resin in the tank 1a, and the resins are supplied to the resin table 3 separately and the electroconductive filler-containing resin is applied to the center region of metal sheet 10 and the electroconductive filler-free resin to the side edge regions through the coating roll 9, as described above.

In the case of applying the electroconductive filler-containing resin to the entire surface of metal sheet 10, the electroconductive filler-containing resin is filled in the tanks 1 and 1a, supplied to the full width in the width direction of resin table 3 and applied to the entire surface of metal sheet 10 by the coater roll 9.

In the case of applying the electroconductive filler-free resin to the entire surface of metal sheet 10, the electroconductive filler-free resin is filled in the tanks 1 and 1a, supplied to the full width in the width direction of resin table 3 and applied to the entire surface of metal sheet 10 by the coater roll 9.

When the resin is applied to both side edges of metal sheet, a portion of the resin sometimes flows out from the side edges during the transportation, storing, etc. and attaches to the surface edge parts of the laminate to deteriorate the laminate quality. Thus, it is preferable to provide edge knives 12 at both of the side edges of coater roll or intermediate roll to remove the resin from the side edges and make the side edges of the metal sheet free from the coating of resin at a distance of about 10 mm from the side edges inwardly.

After the application of the resin to the metal sheet, another metal sheet is placed on the resin-applied surface and press-bonded to make a resin-sandwiched metal laminate.

EXAMPLE 1

1) Steel sheet thickness: 0.45 mm (the same thickness for both sheets)
2) Resin: polyester system (layer thickness: 43 μm)
3) Electroconductive filler: nickel powder; mixing ratio of the nickel powder to the resin: 25%; average particle size: 60 μm (which was reduced to 43 μm by press-bonding of the steel sheets).
4) Resin-sandwiched metal laminate:
    (1) Width: 860 mm
    (2) Layout of electroconductive filler-containing resin arrangement: 80 mm from both edges of the steel sheet inwardly in the width direction of the steel sheet (continuous arrangement in the longitudinal direction of the steel sheet)
5) Loss coefficient: 0.270 (50° C.)

COMPARATIVE EXAMPLE 1

A resin-sandwiched metal laminate provided with an electroconductive filler-containing resin on the entire surface of the steel sheet under the same conditions as in Example 1 was produced.

The loss coefficient was 0.220 (50° C.).

Thus, the vibration damping of the resin-sandwiched metal laminate could be improved.

Another example of producing a resin-sandwiched metal laminate according to the present invention will be given below.

Figure 4:
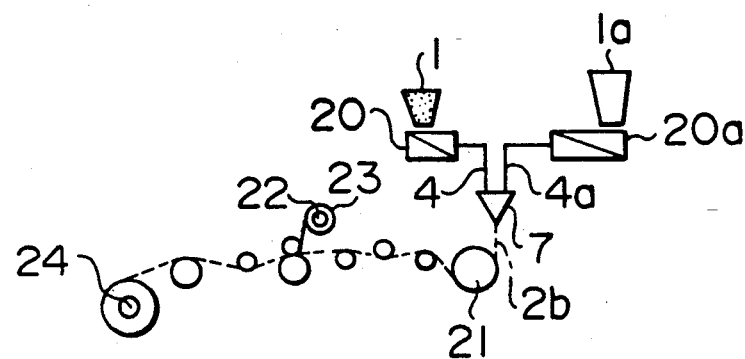
FIG. 4 is a schematic side view showing one embodiment of producing a resin film for a resin-sandwiched metal laminate according to the present invention and FIG. 5 is a schematic front view of the essential part of FIG. 4.
Figure 5:
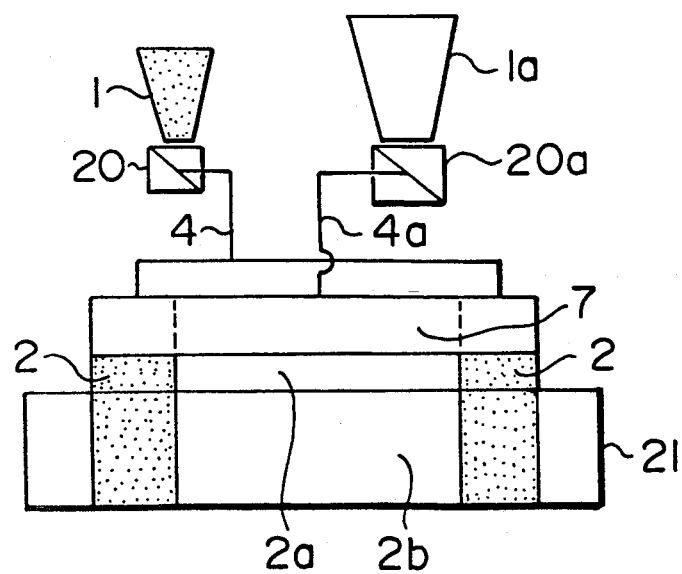

In FIGS. 4 and 5, a granular electroconductive filler-containing resin 2 is filled in a hopper 1 and a granular electroconductive filler-free resin 2a is filled in another hopper 1a. The resins 2 and 2a are transferred from the respective hoppers 1 and 1a to resin melting and pumping means 20 and 20a respectively. The melted electroconductive filler-containing resin 2 is supplied to side edge regions of resin discharge nozzle 7 from the means 20 through supply passages 4 to the side edge regions in the width direction of resin discharge nozzle 7. On the other hand, the melted electroconductive filler-free resin 2a is supplied to the center region of nozzle 7 from the means 20a through a supply passage 5a to the center region in the width direction of nozzle 7.

Then, the electroconductive filler-containing resin 2 from the side edge regions of nozzle 7 and the electroconductive filler-free resin 2a from the center region of nozzle 7 are continuously discharged in a state of film 2b, and the film 2b is cooled on a cooling roll 21 and at the same time, the film thickness is adjusted by controlling the revolution speed of roll 21. In order to prevent the film 2b from any breakage, a separating paper 23 is provided on the film 2b from a rewinding reel 22 and then the film 2b provided with the separating paper 23 is wound onto a winding reel 24 in a coil state and then transferred to a resin-sandwiched metal laminate production line.

When the center region of resin film 2b is made from the electroconductive filler-containing resin and the side edge regions of resin film 2b are made from the electroconductive filler-free resin, the electroconductive filler-containing resin is filled in the hopper 1a and supplied to the center region of nozzle 7 through the supply passage 4a, while the electroconductive filler-free resin is filled in the hopper 1 and supplied to the side edge regions of nozzle 7 through the supply passage 4.

When the entire resin film 2b is made from the electroconductive filler-containing resin, the electroconductive filler-containing resin is filled in the hoppers 1 and 1a and supplied to the entire width of nozzle 7 through the supply passages 4 and 4a.

When the entire resin film 2b is made from the electroconductive filler-free resin, the electroconductive filler-free resin is filled in the hoppers 1 and 1a and supplied to the entire width of nozzle 7 through the supply passages 4 and 4a.

The resin discharge nozzle 7 is composed of, for example, independent nozzles each for discharging the electroconductive filler-containing resin and the electroconductive filler-free resin, arranged or constructed in one body, so as to supply and discharge the electroconductive filler-containing resin and the electroconductive filler-free resin as separated in the width direction of resin discharge nozzle 7 to make a film.

A preferable example of producing a resin-sandwiched metal laminate according to the present invention will be given below.

Figure 6:
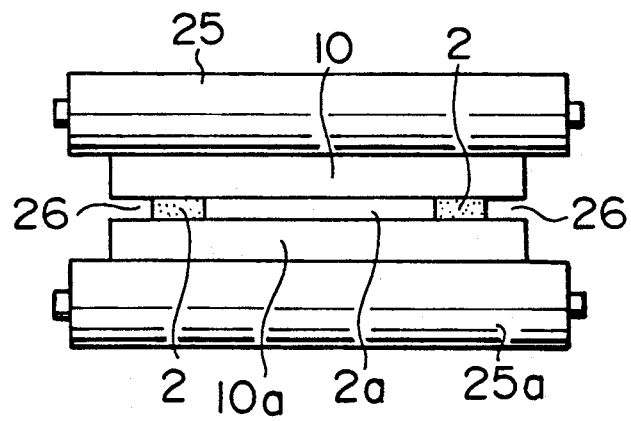
FIG. 6 is a front view showing one embodiment of carrying out the present process.

In FIG. 6, resins 2, 2a are provided in the center region excluding the side edge regions 26 in the width direction between metal sheets 10 and 10a and the metal sheets are press-bonded to each other by rolls 25 and 25a. A portion of the resin 2 in the center region moves towards the side edge regions 26 by the press-bonding and the resins 2, 2a are uniformly distributed in the width direction between the metal sheets 10 and 10a by the press-bonding. That is, a portion of the resin 2 in the center region moves towards the side edge regions 26 and the resin 2 is uniformly distributed throughout between the metal sheets 10 and 10a to securely prevent the squeezing-out of the resin 2 at both ends of the metal sheets. The range of side edge regions 26 which are free from the resin 2 is preferably at most 15 mm from the both edges inwardly (towards the center) in the width direction of metal sheets when the resin layer 2, 2a has a thickness of 30 to 500 μm after the press-bonding. Over 15 mm, the resin 2 sometimes fails to uniformly move to the side edge regions 26 when press-bonded. That is, the resin 2 is not uniformly distributed to the side edge regions 26. When the resin 2 is provided in a range of side edge regions 26 of not more than 10 mm from the edges of metal sheets and press-bonded, a portion of the resin 2 is squeezed out of the edges of metal sheets and attached to the surfaces of metal sheets to deteriorate the quality of laminate.

The foregoing embodiment of the present invention is given in the following Example 2.

EXAMPLE 2

An epoxy system resin (solvent type) was applied to the center region (excluding side edge regions of 10 mm from the edges inwardly in the width direction of steel band) on one side of a steel band, which has a thickness of 0.4 mm, and a width of 1,000 mm as a metal sheet, to a thickness of 43 µm and dried and then another steel band, which has a thickness of 0.4 mm, and a width of 1,000 mm was placed on the resin surface at 190° C. The steel bands were press-bonded under a pressing force of 5000 kg by rolls, whereby the resin layer having a thickness of 43 µm was distributed to the full width of steel bands. In this manner, 100 tons of a resin-sandwiched steel laminate was continuously produced without any squeezing of the resin out of the edges of steel bands.

Another preferable example of producing a resin-sandwiched metal laminate according to the present invention will be given below.

Figure 7:
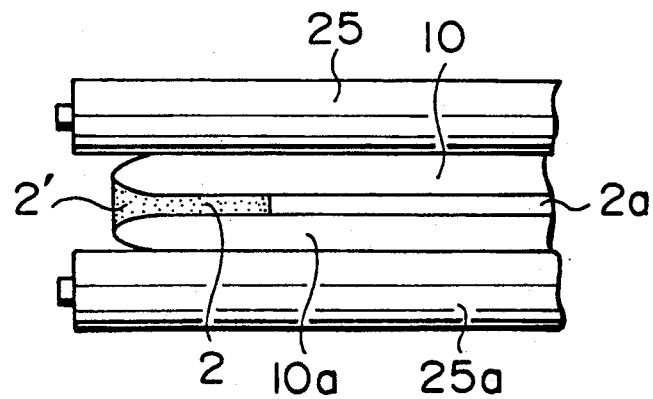
FIG. 7 is a front view showing a preferable embodiment of the present process.

In FIG. 7, side edge regions of both metal sheets 10 and 10a (including other side edge regions not shown in FIG. 7) are made to take convex-curved shapes towards the edges, whereby the resin 2' can be retained in a larger clearance in the side edge regions between the metal sheets 10 and 10a than the clearance in the center region in the width direction of metal sheets 10 and 10a without any squeezing out of the edges, when the resins 2, 2a are press-bonded.

Figure 8A:
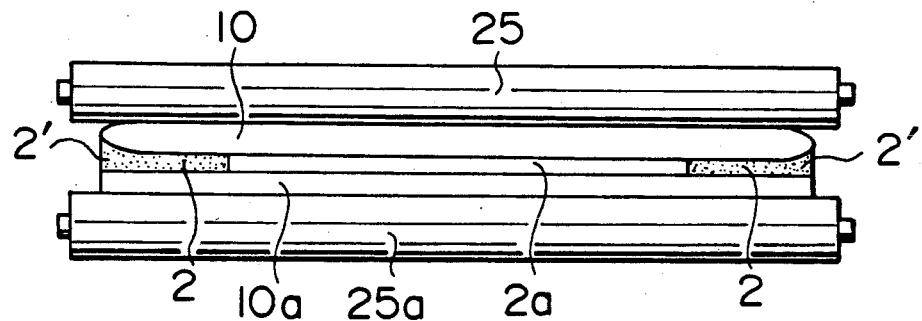
FIG. 8(a) and 8(b) are a front view showing other preferable embodiments of the present process.
Figure 8B:
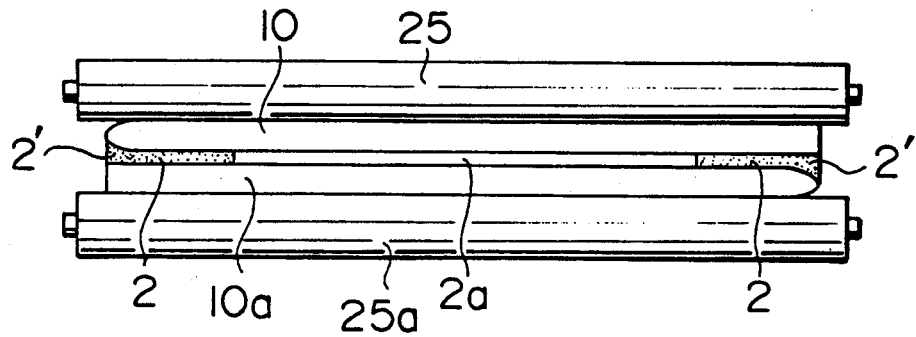

As shown in FIGS. 8(a) and 8(b), only one metal sheet 10 of FIG. 7 is made to have a convex-curved shape in the side edge regions towards the side edges and make the clearance in the side edge regions between the metal sheets 10 and 10a larger than the clearance in the center region in the width direction of metal sheets 10 and 10a. During the press-bonding, the resin 2' can be retained in the larger clearance without squeezing of the resin 2' out of the side edges.

A convex-curved, round shape toward the side edges can be formed in the side edge regions of metal sheets 10 and 10a, for example, by trimming (shearing) edges and rolling the edges under a light pressing force. Otherwise, edge drops are generated during the continuous rolling of a metal band and the edge shape has a convex-curved shape suitable for retaining the resin. Thus, after the rolling, the metal band can be transferred to a resin-sandwiched metal laminate production line without trimming the edges, whereby the squeezing of the resin out of the edges can be securely prevented.

Preferable range of convex-curved shape of the edges is 1 to 2 mm from the side edges inwardly in the width direction of metal sheets.

EXAMPLES 3 AND 4 AND COMPARATIVE EXAMPLE 2

Examples 3 and 4 are given in Table 1 together with Comparative Example 2.

TABLE 1

| Ex. No. | Metal sheet | | | Resin | | Pressing force | Squeezing-out of resin |
| | Species | Thickness | Width | Species | Thickness | | |
| --- | --- | --- | --- | --- | --- | --- | --- |
| 3 | Steel sheet | 0.4 mm | 914 mm | Epoxy-cross-linked | 43 µm | 5,000 kg | none |
| 4 | Steel sheet | " | " | Epoxy-cross-linked | " | " | " |
| Comp. Ex. 2 | Steel sheet | " | " | Epoxy-cross-linked | " | " | occurred |

Note 1: The metal bands were prepared by continuously cold rolling hot-rolled steel sheets, which have a thickness of 1.2 mm, to a thickness of 0.8 mm and further temper rolling the cold-rolled steel sheets to a thickness of 0.4 mm and used without trimming the edges of the steel bands. The resin was applied to one side of one steel band to the full width to a thickness of 43 µm in the form of solution in a solvent and another steel band was placed on the resin-applied surface. Press-bonding of the steel bands was carried out at 190° C.

Note 2: Example 3 is directed to use of steel bands both having a convex-curved shape (as in edge drop states) at the edges without trimming the edges after the rolling.

Example 4 is directed to use of one steel band having a convex-curved shape (as in edge drop states) as in Example 3 and the use of another steel band in a full straight side state after trimming the edges after the rolling.

Example 4 is directed to use of one steel band having a convex-curved shape (as in edge drop states) as in Example 3 and to use of another steel band in a full straight side state after trimming the edges after the rolling.

Comparative Example 2 is directed to use of both steel bands in a full straight side state after trimming the edges after the rolling.

A further preferable example of producing a resin-sandwiched metal laminate according to the present invention is given below.

Figure 9:
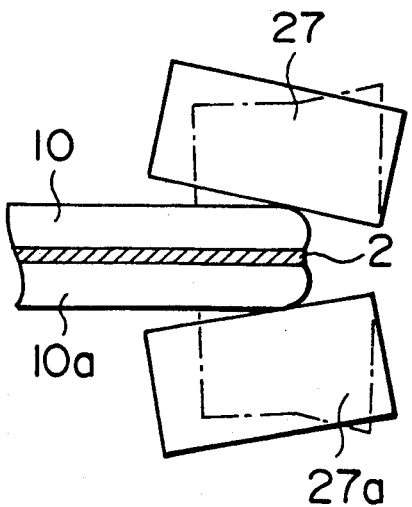
FIG. 9 is a schematic cross-sectional view showing the side edges in the width direction of a resin-sandwiched metal laminate according to one preferable embodiment of the present invention.

As shown in FIG. 9, a resin 2 is provided between metal sheets 10 and 10a and the edge parts are pressed by rolls 27 and 27a to press-bond the resin 2 securely between the metal sheets 10 and 10a, where only edges on one side is shown.

In the present invention, a resin, such as a film resin or a solvent-type resin, is provided between metal sheets and the edge parts of the metal sheets are pressed by rolls at an inlet side or outlet side of pressing rolls when the metal sheets are pressed to the full width in the width direction of metal sheets to press-bond the resin between the metal sheets, whereby the resin in the side edge regions is securely press-bonded. When the pressing rolls are arranged in a plurality of pairs, the edge parts can be pressed between one pair of rolls and another pair, whereby a satisfactory effect can be obtained.

The foregoing embodiment of the present invention are given in the following Examples 5 and 6 together with Compartaive Example 3.

EXAMPLE 5

A solvent-type resin (epoxy-based) is provided between steel bands (sheets), which are a thickness of 2.0 mm and a width of 954 mm, to a thickness of 45 $\mu$m and passed through two pairs of pressing rolls (roll diameter: 550 mm; roll length: 2,100 mm) to press the steel bands to the full width in the width direction of steel bands under a pressing force (linear pressure) of 60 kg/cm at a temperature of 200° C. and a sheet-passing speed of 10 mpm; and then the side edge parts, 20 mm, from the edge inwardly of steel bands were pressed by a pair of rolls (roll diameter: 110 mm) under a pressing force (linear pressure) of 80 kg/cm at the outlet side of the two pairs of the pressing rolls, whereby the resin at the side edge pafts was securely press-bonded between the steel bands.

EXAMPLE 6

Steel bands were pressed under the same conditions as in Example 5 except that the same side edge parts in the width direction of the steel bands were pressed by the pair of rolls at the inlet side of the two pairs of the pressing rolls (similarly to the case of the outlet side thereof) while pressing the steel bands to the full width in the width direction of the steel bands by the two pairs of the pressing rolls, whereby the resin at the side edge parts was securely press-bonded between the steel bands.

COMPARATIVE EXAMPLE 3

Figure 14:
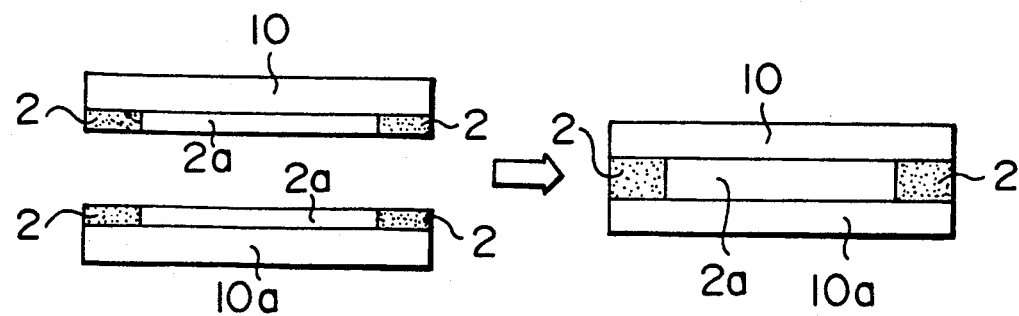
Figure 15:
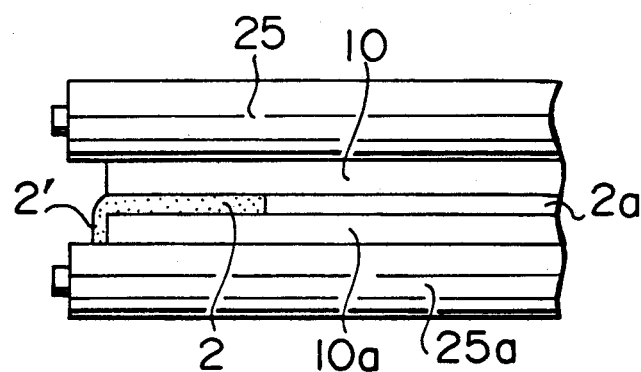
FIG. 15 is a front view showing one embodiment of the conventional process for producing a resin-sandwiched metal laminate with respect to the present invention shown in FIGS. 7, 8(a) and 8(b).
Figure 16:
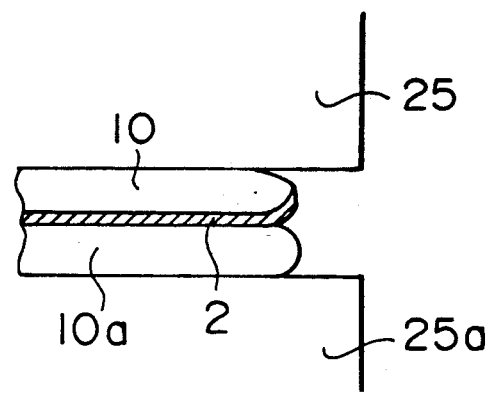
FIG. 16 is a schematic cross-sectional view showing the side edges in the width direction of a resin-sandwiched metal laminate according to the conventional process with respect to the present invention shown in FIG. 9.
Figure 17:
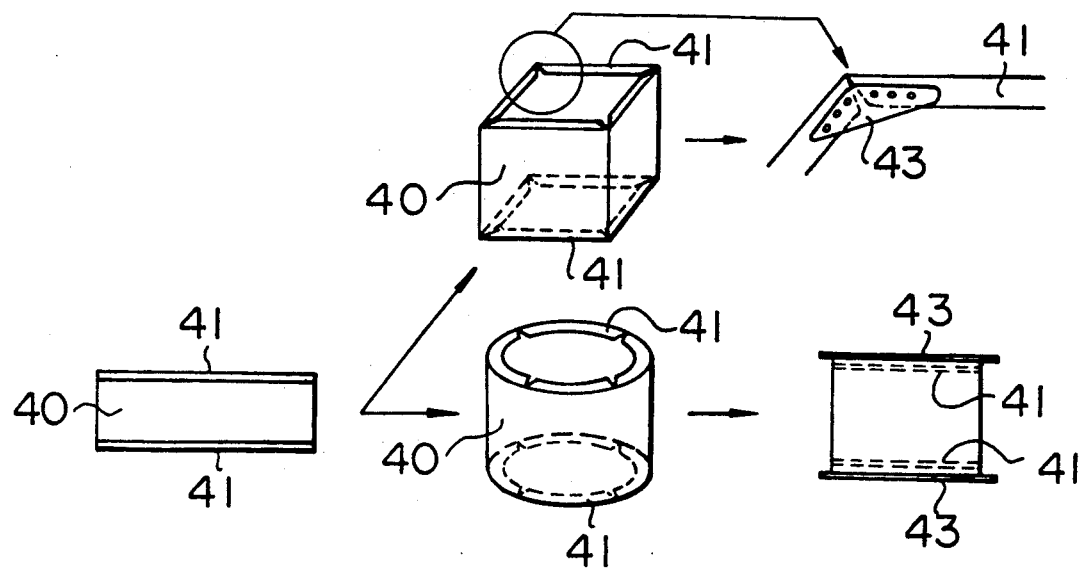
FIG. 17 shows a schematic view showing one embodiment of the conventional process for producing a vessel-shaped member by welding.

Steel bands were pressed under the same conditions as in Example 5 except that the same side edge parts in the width direction of the steel bands were not pressed by the pair of rolls at either the inlet side or the outlet side of the two pairs of the pressing rolls, and the resin at the side edge parts in the width direction of the steel bands was not securely press-bonded, as shown in FIG. 14.

A preferable example of an apparatus for producing a resin-sandwiched metal laminate according to the present invention will be given below.

Figure 10:
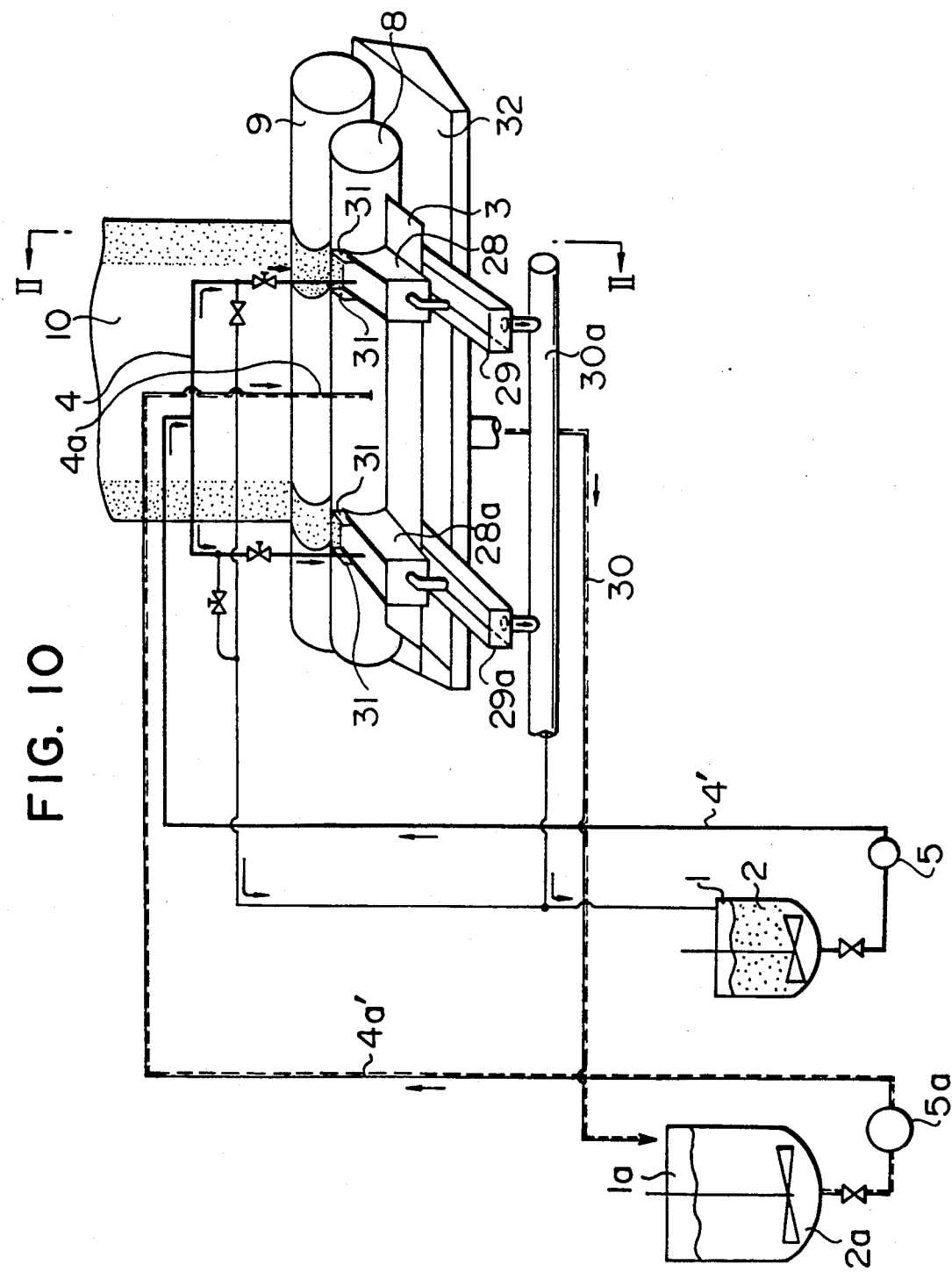
FIG. 10 is a schematic front view showing one embodiment of an apparatus for producing a resin-sandwiched metal laminate according to the present invention.
Figure 11:
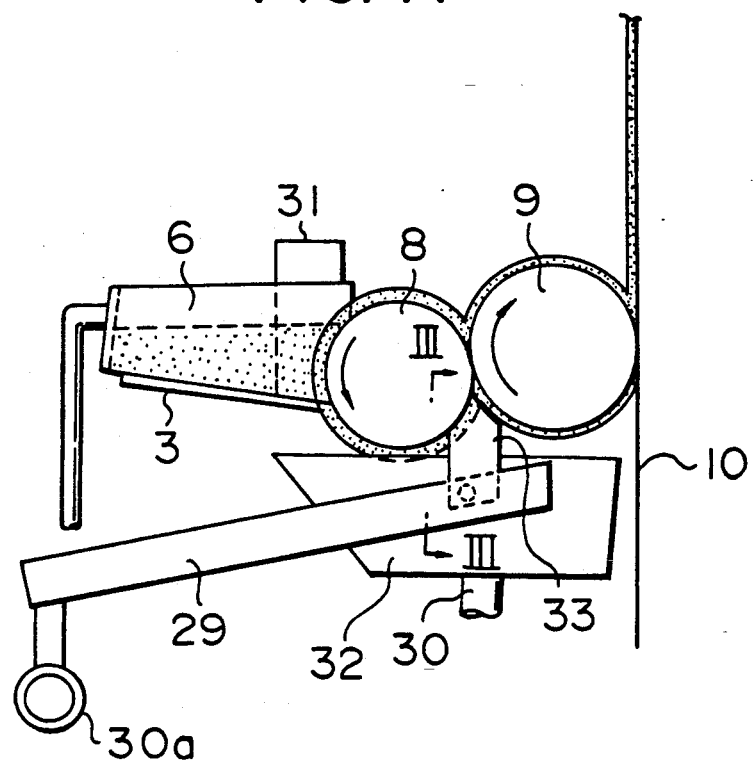
FIG. 11 is a schematic cross-sectional side view as seen from the arrow II—II of FIG. 10

In FIG. 10 and 11, an electroconductive filler-containing resin 2 is filled in a resin tank 1 and supplied to measure (or boxes) 28 and 28a provided at both edge parts in the width direction of a resin table 3 from a supply line 4' through a pump 5 and a manifold 4, and picked up from the measures 28 and 28a onto a pickup roll 8 and applied to both side edge regions of a metal sheet 10 through a coater roll 9. Excess resin 2 is returned to the resin tank 1 from the measures 28 and 28a, which have a shape as shown in FIGS. 10 and 11, through troughs 29 and 29a and a line 30a. Teflons plates (or separators) 31 are provided at both sides of each of the measures 28 and brought into contact with the pickup roll 8 and the resin table 3 to prevent the resins from inflowing and flowing out.

On the other hand, an electroconductive resin-free resin 2a is filled in another resin tank 1a and supplied to a resin table 3 in the center region in the width direction of the resin table 3 from supply lines 4a' and 4a through a pump 5a, picked up onto the pickup roll and applied to the center region of the metal sheet 10 through a coater roll 9.

Then, the applied resins 2 and 2a are dried, and another metal sheet (not shown in the drawings) is placed on the resin-applied surface and press-bonded to make a resin-sandwiched metal laminate.

Excess resin 2a supplied to the center region of the resin table 3 falls into a vessel 32 and is returned to the resin tank 1a from the vessel 32 through a line 30.

Figure 12:
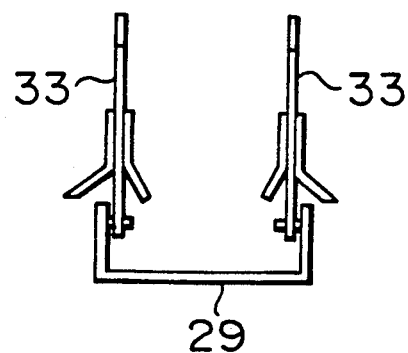
FIG. 12 is a schematic view showing provision of separators as seen from the arrow III—III of FIG. 11.

In order to prevent the electroconductive filler-containing resin 2 in the side edge regions in the width direction and the electroconductive filler-free resin 2a in the center region, each of which falls from the pickup roll 8 and the coater roll 9, from intermixing, separators 33 are provided at boundary positions between the electroconductive filler-containing resin 2 and the electroconductive filler-free resin 2a, as shown in FIG. 11 and 12, that is, on both sides each of troughs 29 and 29a, as shown in FIG. 12.

As described above, the resin supply passages 4 and 4a are provided separately to correspond to the side edge regions and the center region in the width direction of the resin table 3, and lines 4', 4a', 30 and 30a are provided for the resins 2 and 2a between the resin supply passages 4 and 4a and the resin tanks 1 and 1a, and separators 33 are provided at the resin boundary positions between the pickup roll 8 and the coater roll 9 in the present invention.

Another example of producing a resin-sandwiched metal laminate according to the present invention will be given below.

Figure 13:
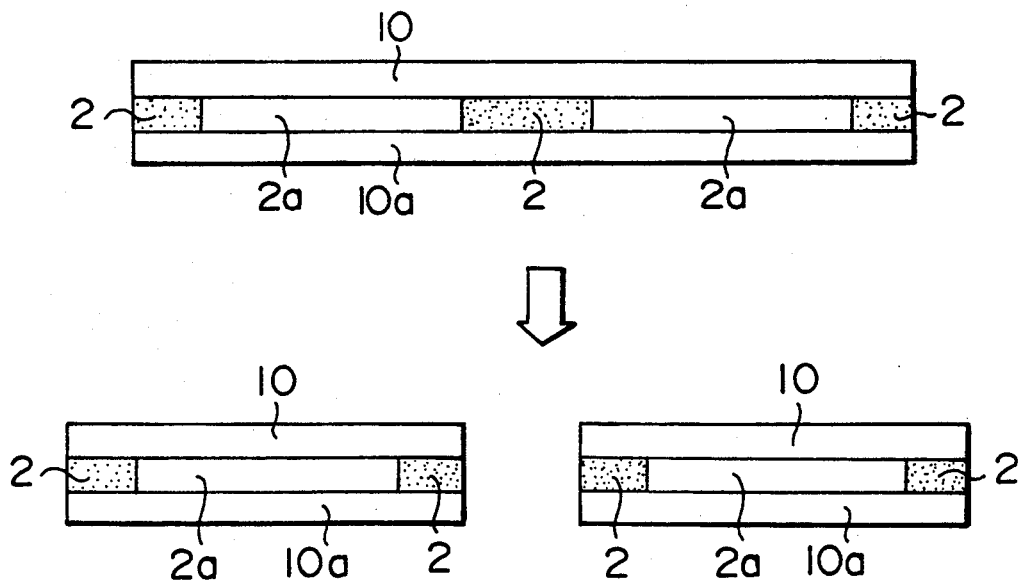
FIGS. 13 and 14 are a schematic view showing one embodiment of a process for producing a resin-sandwiched metal laminate according to the present invention, respectively.

In FIG. 13, a resin-sandwiched metal laminate, which has a resin layer composed of the electroconductive filler-containing resin 2 and the electroconductive filler free resin 2a between metal sheets 10, 10a, is produced, the width of the resin 2 in the center region being two times as that of the resin 2 in the side edge regions, and then the produced resin-sandwiched metal laminate is divided into two portions.

Another example of producing a resin-sandwiched metal laminate according to the present invention will be given below.

In FIG. 14, two metal sheets 10, 10a, each of which has a resin layer composed of the electroconductive filler-containing resin 2 and the electroconductive filler free resin 2a, are prepared. And a surface of the resin layer of the metal sheet 10 is provided on a surface of the resin layer of the metal sheet 10a, and then the resin layers are press-bonded between the metal sheets 10, 10a. As the resin 2, 2a, for example, polyisobutylene system resin is used.

What is claimed is:

1. An apparatus for producing a resin-sandwiched metal laminate by applying a resin to one side of one metal sheet, placing another metal sheet on the surface of the applied resin and press-bonding the resin between the metal sheets, the apparatus having a resin-applying means which comprises:

resin supply passages formed by dividing a resin supply passage into a center region and side edge regions on a resin table in the width direction of the resin table, a resin tank for supplying an electroconductive filler-containing resin to one of the resin supply passages through an electroconductive filler-containing resin line, another resin tank for supplying an electroconductive filler-free resin to the remaining resin supply passage through an electroconductive filler-free resin line, the resin table for selectively supplying the electroconductive filler-containing resin and the electroconductive filler-free resin to a resin coater roll through a pick-up roll, the resin coater roll for coating the selectively supplied resins to one side of one metal sheet, a resin receiver for recovering excess resin supplied to the resin supply passage formed in the center region on the resin table, resin receivers for recovering excess resin supplied to the resin supply passages formed in side edge regions on the resin table, and separators for providing separation between the electroconductive filler-containing resin and the electroconductive filler free resin supplied in excess to the pickup roll and the coater roll without intermixing of the resins, provided at boundary positions of the resins.

2. An apparatus according to claim 1, wherein the resin supply passages formed in the side edge regions on the resin table are measures having a resin supply outlet to the pickup roll surface.

3. An apparatus according to claim 1, wherein the resin receivers for recovering the excess resin supplied to the resin supply passage formed in the side edge regions on the resin table are troughs and the separators are partition plates provided at the upper parts on both sides of the troughs.

4. An apparatus according to claim 1, wherein resin return lines for returning the excess resin from the resin receivers to the respective resin tanks are further provided.

* * * * *